United States Patent
Mäenpää et al.

(10) Patent No.: US 6,851,606 B2
(45) Date of Patent: Feb. 8, 2005

(54) METHOD FOR PRESENTING PROPRIETARY DATA ON A SIM CARD

(75) Inventors: Ismo Mäenpää, Muurame (FI); Tero Sillander, Jyväskylä (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/262,915

(22) Filed: Oct. 2, 2002

(65) Prior Publication Data
US 2003/0066881 A1 Apr. 10, 2003

(30) Foreign Application Priority Data
Oct. 10, 2001 (FI) .............................................. 20011968

(51) Int. Cl.⁷ .................................................. G06K 5/00
(52) U.S. Cl. ...................... 235/380; 235/375; 235/382; 235/451; 235/491; 455/418
(58) Field of Search ................. 235/375, 380, 235/382, 451, 491; 379/144; 455/418

(56) References Cited

U.S. PATENT DOCUMENTS

| | | | | |
|---|---|---|---|---|
| 5,655,003 A | * | 8/1997 | Erving et al. ............... | 379/418 |
| 5,748,720 A | | 5/1998 | Loder ......................... | 379/144 |
| 5,864,757 A | * | 1/1999 | Parker ........................ | 455/418 |
| 5,867,788 A | * | 2/1999 | Joensuu ...................... | 455/445 |
| 5,881,235 A | * | 3/1999 | Mills .......................... | 709/221 |
| 5,887,253 A | * | 3/1999 | O'Neil et al. ............... | 455/418 |
| 6,141,564 A | * | 10/2000 | Bruner et al. ............... | 455/558 |
| 6,175,741 B1 | * | 1/2001 | Alperovich .................. | 455/458 |
| 6,445,914 B1 | * | 9/2002 | Findikli et al. ............. | 455/411 |
| 6,480,710 B1 | * | 11/2002 | Laybourn et al. ........... | 455/406 |

FOREIGN PATENT DOCUMENTS

| | | | | |
|---|---|---|---|---|
| AU | 200041173 B2 | | 4/2000 | ............ H04Q/7/32 |
| SE | 900039 A | * | 7/2000 | ............ H04Q/7/32 |
| WO | WO 01/06802 A1 | | 1/2001 | ............ H04Q/7/32 |
| WO | WO 01/47304 A1 | | 6/2001 | ............ H04Q/7/32 |

* cited by examiner

*Primary Examiner*—Steven S. Paik
(74) *Attorney, Agent, or Firm*—Cohen, Pontani, Lieberman & Pavane

(57) ABSTRACT

A method for presenting proprietary information in the SIM card of a mobile station, which includes at least an updatable address space (11), in which there are areas for at least the application data (11.2, 11.3) of different mobile communications network systems and for end-user or similar subscriber data (11.4), as well as a possible microcontroller (10). A proprietary address space (25.1), which contains proprietary information in a set manner, is reserved in the address space (11).

22 Claims, 2 Drawing Sheets

# METHOD FOR PRESENTING PROPRIETARY DATA ON A SIM CARD

PRIORITY CLAIM

This application claims priority from Finnish Patent Application No. 20011968, filed on Oct. 10, 2001.

FIELD OF THE INVENTION

The present invention relates to a method for presenting proprietary data on a mobile terminal device's SIM card, which includes at least an updatable address space, in which there are at least areas for at least the application data of different mobile systems and the subscriber data of the end user or similar and a possible microcontroller unit.

BACKGROUND OF THE INVENTION

In mobile communications systems, smart-card applications are used to make a distinction in a mobile terminal device (ME=Mobile Equipment) between a so-called general apparatus part (mobile station) operating in a mobile network of a defined type and a separate network/customer-specific part, which is generally known as a so-called SIM card.

At present, the use of mobile equipment in a specific type of mobile network generally demands that the end user has a subscription, which identifies, among other things, the mobile network, in which the communication is take place and the individual settings relating to the subscription, Such as the operator setting and the subscriber identifier of the end user. According to the state of the art, the data are recorded on a small silicon chip, on which at least memory areas are arranged for recording the aforementioned settings and loading them into the mobile station being used, as well as a possible microcontroller operating as the processor unit. Such an entirety is generally called a SIM (Subscriber Identity Module). The SIM is usually placed on an easily-handled plastic base, the compact package thus formed being generally called a SIM card.

A generally compatible location is arranged for the SIM card in the mobile station ME, in which contacts studs are arranged to connect the card electrically to the mobile station. The general construction of the SIM card includes not only a possible microcontroller, but also various memory devices and auxiliary circuits, which relate to things such controlling data transfer and the power supply. All of these are connected to each other with the aid of a data-transfer channel (Bus), which permits communication between the different parts of the SIM card.

The microcontroller that may be located on the SIM card has its own operating system, of which, as is known, there are several different manufacturers. The functions incorporated in the operating system include the microcontroller's instruction set and file references for, among other things, reading, interpreting, and updating the network, terminal, and user parameters recorded in the memory devices. Usually, the memory devices of a SIM card comprise so-called ROM and RAM memories and an erasable and reprogrammable EEPROM address space, which does not lose the data recorded on it, even if the power supply to it is cut off at times.

During the initialization of the SIM card, the file system defined in the standard is created in the EEPROM address space, in which the operator-specific mobile network related settings, the PIN code identifying the user, the user's telephone number memory, and text messages, for example, are recorded. The hierarchic file system, which is formed like a tree, is uniquely standardized and its application branches can be followed to retrieve files from the address space, which can be regarded as the address of the memory location, in which unique data relating to a specific subscription or network function are stored. These data are recorded in such a way that they can be read and modified by all manufacturers' equipment, provided that the equipment operates in accordance with the relevant mobile network standards.

The SIM standards define such matters as the order and coding of the data, i.e. the significance of the bits, and the use of the data, i.e. in which situations the ME uses which data and how and when they are updated. Further, the standard defines reading and writing rights, such as 'never', 'always when the user enters the PIN or PIN2 code', or 'only after authentication' (in TETRA). SIM cards according to the known standard are generally used in different mobile networks (GSM, UMTS, CDMA, etc.). A SIM standard for the TETRA system also exists, but, as far as is known, cards according to it have not yet been introduced. This appears to be perhaps partly due to the fact that the TETRA system is at present mainly used by organizations, so that accurate identification of the user and the amount of communication are not of great practical importance, as they would be generally in commercial operator-run networks, particularly in the case of a private user.

The principles of the operation of the mobile station's interface (MMI=Man-Machine Interface) and of the mobile station ME vary greatly between different equipment manufacturers. Thus, at present the various equipment manufacturers have differing needs to record non-standard, proprietary and user or subscriber-specific data on SIM cards. However, in SIM cards according to the state of the art, there is no readiness according to the standard for defining and recording such proprietary data. However, it would be very useful to be able to transport the proprietary data, independently of the mobile station being used.

The state of the art for recording and transferring proprietary data between different mobile stations is represented by solutions, in which the mobile station uses specific fields of the files defined in the SIM-card standard. This in turn leads to the card-manufacturers' and operators' own special solutions. Methods provided by the SIM application toolkits can also be used for this purpose. These solutions, however, have the general disadvantage that each manufacturer has its own non-uniform, scaled solution for recording data, which is uneconomical and causes problems when changing SIM cards between different manufacturers' mobile stations. Further, the strong reliance of the markets on operators often ignores the point of view of the equipment manufacturer, because no solution is defined in the standard.

The state of the art is referred to in U. S. Pat. No. 5,864,757 (Parker), which discloses a locking and opening method for permitting a terminal to be used in the network of a set operator. The publication discloses the recording of a response on a SIM card in which the response is derived in an extremely complicated manner from data linked to the manufacturing batch of the terminal. In this case, no direct reference to proprietary data is even possible. The application of the invention is such that the motivation for arranging such recording lies specifically with the operator. The recording is therefore arranged to take place in the manner described above, which uses poorly scalable operator-specific solutions.

SUMMARY OF THE INVENTION

The present invention is intended to create a new type of method for recording proprietary information on a SIM card, which will substantially improve the scalability, logistics, and transferability of the cards. The present invention is directed to a method for presenting proprietary information in the SIM card of a mobile station, which includes at least an updatable address space, in which there are areas for at least the application data of different mobile communications network systems and for end-user or similar subscriber data, as well as a possible microcontroller. A proprietary address space, which contains proprietary information in a set manner, is reserved in the address space. The method according to the invention permits the recording of any proprietary information whatever in a standardized way on the SIM card of the mobile station and the flexible transferability of the data, at least between the same manufacturer's equipment. A memory area in the address space of the card is reserved for the recording of the information.

With the aid of the invention, advantages are gained, for example, the fact that different equipment manufacturers can offer end-users manufacturer-independent identification means. For example, the user's access rights to the special properties of a mobile station of a specific manufacturer can be recorded in a reserved area of the SIM card, according to the method of the invention.

Using the method according to the invention, a significant scalability advantage is achieved, so that the card manufacturer and the operator can be given guidelines by using a standard to refer to a generally known solution for recording proprietary information, instead of defining a special solution. Thus, a memory area reserved for standardized proprietary information would most probably be incorporated in most cards, therefore providing a uniform way of recording the proprietary information.

Further, the SIM card according to the method of the invention will substantially facilitate logistics, because the more manufacturers' cards have a place for proprietary information, the easier it will be to find such a card without making special arrangements.

According to one preferred embodiment, the data can be recorded in an encrypted form according to a set proprietary criterion, so that other manufacturers' equipment cannot understandably read the proprietary information recorded in the memory area defined in the relevant standard. According to a second preferred embodiment, information of several different manufacturers can be recorded on a single SIM card in the reserved proprietary memory area, in which case the equipment of each manufacturer will be able to interpret only its own information. If, according to a third preferred embodiment, the data are in an unencrypted form, and the interfaces of the equipment of different manufacturers have the same features, the equipment of different manufacturers will then be able to use the same data. Other characteristic features of the method according to the invention will become apparent from the accompanying claims while additional advantages gained are itemized in the description section.

BRIEF DESCRIPTION OF THE DRAWINGS

The method according to the invention, which is not restricted to the embodiments described in the following, is examined in greater detail with reference to the accompanying drawings, in which.

DETAILED DESCRIPTION OF THE PRESENTLY PREFERRED EMBODIMENTS

Figure 1:
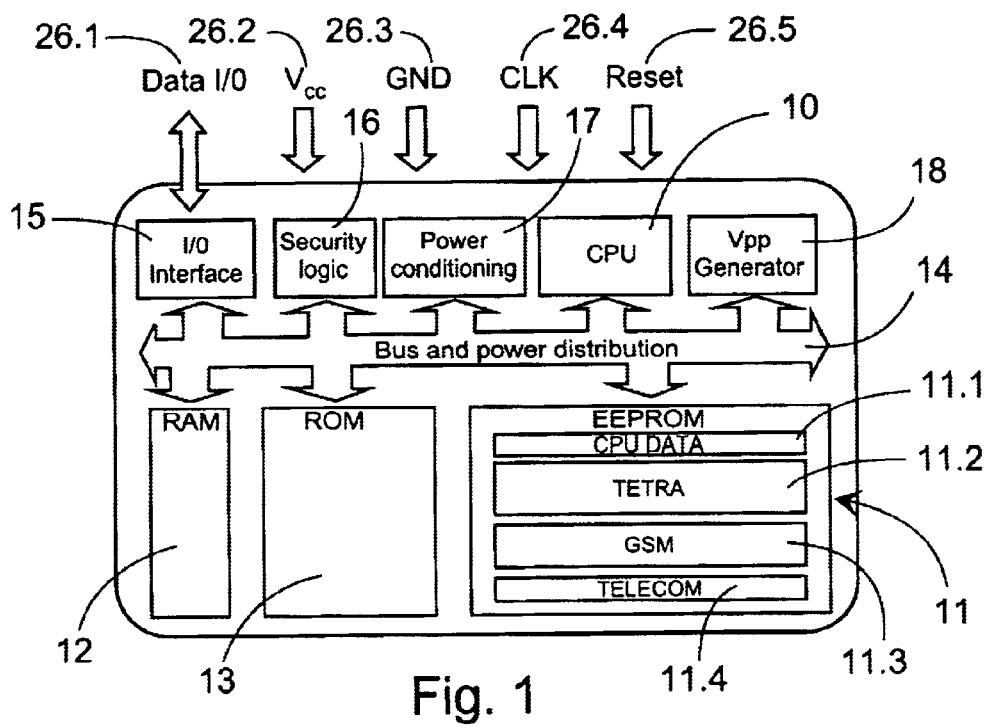
FIG. 1 shows a schematic diagram of the general structure of the SIM card.

In FIG. 1, all the data relating to the mobile network and the subscriber is incorporated on the SIM card on a closed semiconductor chip, to form a small and easily changeable unit. Thus, there is no need to arrange memory means in the mobile station for end-user identification, or the network settings. The SIM card can be easily removed and placed in another mobile station, without the end-user losing their personal settings. This is particularly useful if the station requires servicing or the end-user wishes to replace their old mobile station with a new model. It also permits the end-user to personalize a new mobile station by simply installing their own SIM card in it, assuming that the station in question is compatible with the required mobile network system.

SIM cards have several functions, the most important being, for example, acting as the permanent memory of the mobile station when recording settings, which are required for using different network systems, as well as the subscriber's personal settings (for example, telephone books, SMS messages). In addition, the SIM card incorporates the network-recognition algorithms and the instructions and processing required to use them when operating the mobile station, as well as some of the network-recognition processes to be performed, in which, for example, the user's mobile-network communications encryption keys are formed and recorded.

The life cycle of a SIM card is divided broadly into three different stages. The first stage is the actual manufacturing stage, in which, among other things, the SIM card is assembled, loaded with an operating system, and has a file system installed. Also in the manufacturing stage the capacity of the files is attached, as are most of the reading and writing rights, and the files are initialized using initial values.

After the manufacturing stage comes the so-called administrative stage, in which the SIM is in the possession of, for example, a network operator or similar. The contents of the operator's network and subscriber-specific and/or user-specific files are then entered in it, and the rest of the reading and writing rights are set, prior to the SIM card being delivered to the customer, end-user, or similar.

The final stage is generally known as the operating stage, when the SIM card is placed in a mobile station of an end-user or similar, to form with it functioning mobile equipment, i.e. ME.

FIG. 1 shows a rough example schematic diagram of the structure of a SIM card and of the operating components arranged in it. Though, as such, the SIM cards of different card manufacturers may differ, the cards' components are, as such, operationally similar. A SIM card generally has a possible microcontroller, i.e. central processing unit (CPU) 10 and an updatable EEPROM address space 11 that will retain data without a power supply, and other auxiliary elements, integrated on a single silicon chip, which is secured and sealed to a contact cushion.

The SIM card according to the example is, as such, an independently operating unit, on which incorporates all the functions that are generally regarded as part of the processor environment. The SIM card exchanges data with the mobile station ME using a series communication protocol according to an ISO standard. The microcontroller 10 located on the SIM card in the embodiment according to the example is, as such, a complete processor system, except for the creation of the clock pulse (CLK) and the power supply, which are generally provided by the mobile station ME, to which the SIM card is connected.

The SIM card according to the example has not only a microcontroller 10 and memory devices 11, 12, 13, but usually also an I/O interface 15, which handles data transfer in this manner from the card to the mobile station ME and from the mobile station ME to the card. A dedicated Circuit 16 is arranged for the card's security logic. In addition, the card has a $V_{pp}$ generator 18 and a power supply control circuit (power conditioning) 17.

The memory devices include RAM and ROM memories 12, 13, which have, among other things, attached data, such as the operating system of the microcontroller 10 with its instruction sets. Areas of the permanent and updatable EEPROM address space 11 are reserved for data such as the settings 11.1 of the microcontroller and the application data of various mobile systems (e.g., GSM, TETRA) 11.2, 11.3, as well as the application and network-independent settings and subscriber data 11.4 (for example, the phone book memory). All the partitions of the SIM card are connected by an internal bus and power distribution 14. Besides the power supply contact $V_{cc}$ 26.2 and the clock pulse contact CLK 26.4, the SIM card is in electrical contact with the mobile station ME at least through the data I/O 26.1, a ground contact GND 26.3, and a RESET contact 26.5.

Figure 2:
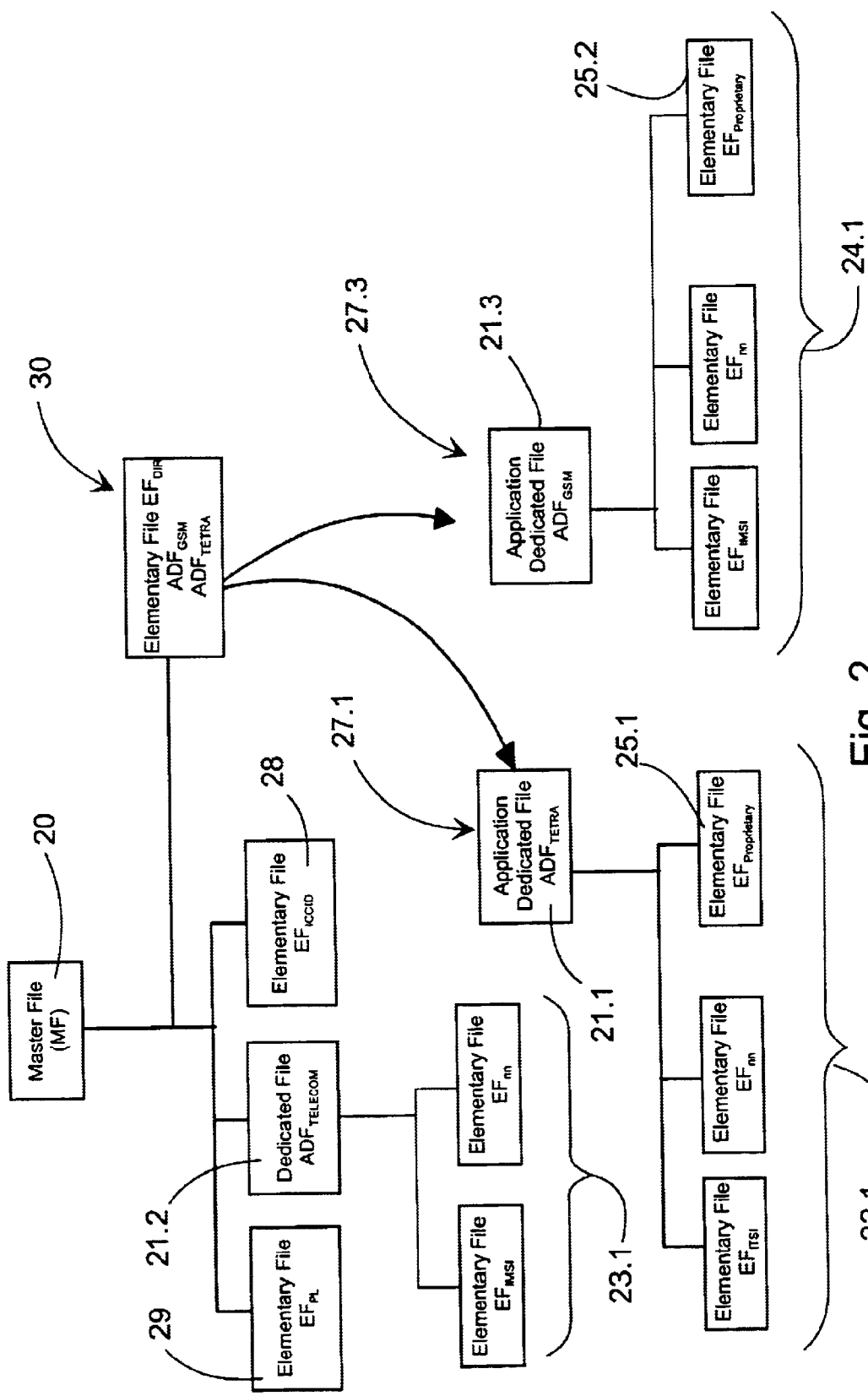
FIG. 2 shows a schematic diagram of the file system of the SIM card implementing the method according to the invention.

FIG. 2 shows an example of a file system according to the standard, which is arranged to record data in the EEPROM address space 11. The address space 11 can be arranged to form a logical file system, which has a root directory the Master File (MF) 20. The operating system of the SIM card sets the MF 20 as the default directory automatically when the SIM is activated or when the settings are reset. Immediately under the MF 20 is a file $EF_{DIR}$ 30 (Elementary File), which contains references to application branches $ADF_{TETRA}$ and $ADF_{GSM}$ 27.1, 27.3 (Application Dedicated File) and the files $EF_{ICCID}$ 28 and $EF_{PL}$ 29, which record data such as the series number of the SIM card and the language codes used in the settings of the interface and the processing of SMS messages.

Further under the MF 20 is the sub-directory $DF_{TELECOM}$ 21.2 (Dedicated File), which has files 23.1 containing the end-user's own information, such as the telephone number list, information of the calls last made, recorded text messages, etc., which can be accessed by the mobile station ME independently of the application branch being used. All the files that are directly under the MF 20 are universal, though $DF_{TELECOM}$ 21.2 is optional.

Usually the use of a DF permits files to be grouped functionally in sub-directories. Under a DF there can be files EF (Elementary Files), containing in formation grouped according to each standard and identified by means of the file's EF sub-indexed two-byte identifier. A DF can also act as a parent to another DF. An application branch (ADF, Application Dedicated File) is a special DF, containing all the DFs and EFs of a specific application.

The $EF_{DIR}$ 30 immediately under the MF 20 contains a reference to the application branches ADF (Application Dedicated Files), which include, among others, the network systems $ADF_{TETRA}$ (TETRA) 27.1 and $ADF_{GSM}$ (GSM) 27.3. $ADF_{TETRA}$ 21.1 and $AD_{GSM}$ 21.3 contain only header data and have under them all the files EF belonging to the relevant application branches 27.1, 27.3. The instructions to be performed can be connected only to a specific application branch, thus cannot be performed outside of it. The file system can include more application branches 27.1, and 27.3, depending, for example, on the number of types of mobile network for which the SIM card in question is intended.

Each application branch 27.1, 27.3 has files EF 22.1, 24.1, each containing data that is precisely defined in the standard. One possible example of a file in an application branch is the file $EF_{INFO}$ in the application branch $ADF_{TETRA}$ 27.1 of the TETRA system, in which information (not shown) relating to emergency calls is stored. It should be understood that FIG. 2 does not show all the files stored in the application branches 27.1, 27.3, but only shows a rough schematic diagram of the formation of the file system.

The files EF (Elementary Files) of the application branches ADF can be located anywhere on the branch in question and can contain any type of information whatever relating to either the network system itself, or to the mobile station. EFs under different application branches ADF can have the same identifier, in which case they are distinguished from each other on the basis of the directory paths.

The EFs mainly form three type groups. The open structure Transparent EF is formed linearly from consecutive byte cycles. When reading or updating the byte cycle that is the object of the operation, reference is made to the cycle's relative address, indicates the start of the cycle in bytes and the number of bytes to be read or updated. Thus, the Transparent EF type permits the data recorded in it to be partly read or updated.

A second file type is the Linear Fixed EF. This has a linear structure containing consecutive records, which are set to have an equal length. The records are addressed using an ID number, which is numbered starting from the first record. The records can only be read or updated in their entirety. According to the present standard, there can be a total of 254 records, each one containing a maximum of 255 bytes.

A Cyclic EF is similar to the Linear Fixed EF, but in it the list's last record is linked to the first record, to form a ring structure. This structure is used, for example, when recording chronological data, in which the oldest record in the list is always replaced with the latest updated record. One example of the use of a Cyclic EF is the list of phone numbers last called. A publication dealing with the SIM-card standard is ETSI TS 102 221 V4.0.0 (2001–01) 'Smart cards; UICC-Terminal interface; Physical and logical characteristics (Release 4)'.

Besides the above types, a Key EF can be used, which has a similar structure to the Linear Fixed EF. The Key EF is a specific TETRA system file type used to store encryption keys.

In the method according to the invention, a dedicated memory area, referred to in the application branch as essentially its own file, is reserved for recording the proprietary information in the file structure arranged in the EEPROM memory area 11. According to one preferred embodiment, only a mobile station ME of the manufacturer in question can interpret and use the proprietary information. Space for the relevant file, which can be marked, for example, $EF_{PROPRIETARY}$ 25.1, 25,2, can be reserved in the application branches of the file system. The file in question is preferably of the type Transparent EF, for example, allowing the different manufactures' information to be of different lengths.

According to one preferred embodiment, the $EF_{PROPRIETARY}$ 25.1 can contain a separate record for each manufacturer, in which the structure of the record can, for example, be arranged in such a way that its first field is reserved for the manufacturer's name or a corresponding code, the next field has the length of the actual data field stated in bits, while proprietary information is recorded in the last field. The first field is defined to uniquely identify the manufacturer that recorded the information in the EF. The values for this field may be derived from the serial number of the terminal being used, or alternatively the value can be defined in some other set manner. In the record following the first record, there may be corresponding information for a second manufacturer. According to one embodiment, the proprietary information is preferably coded to be encrypted, so that other manufacturers' equipment cannot interpret and use it.

The actual proprietary information can contain, for example, settings relating to the properties of the telephone and their user rights. For example, one bit can be used to state that the end-user has been given permission to interrupt a call of another end-user in the relevant network system. The settings thus apply to user-specific rights. Customer-specific rights too, for example in a TETRA network, can preferably be set, in which case the limitations and rights typically concern a larger unified group.

The creation of a memory area according to the method takes place in stages, in which in the administrative stage of the SIM card the relevant $EF_{PROPRIETARY}$ File 25.1, 25.2 is created in the desired application branches $ADF_{TETRA}$ 27.1, $ADF_{GSM}$ 27.3. As the next stage, the operator sets its own settings relating to its mobile network, such as the SIM card's subscriber identifier. The recording of proprietary data according to the invention in the created $EF_{PROPRIETARY}$ file 25.1, 25.2 alternatively takes place either in this operator stage, or only in the end-user stage following the operator stage, when the SIM card with the $EF_{PROPRIETARY}$ file 25.1, 25.2 is placed in the mobile station and the presence of the file $EF_{PROPRIETARY}$ 25.1, 25.2 is detected.

Further additions and updates can be made to the proprietary information during the operating stage of the SIM card while the SIM card can also be placed in another manufacturer's mobile station, which can also detect the presence of the $EF_{PROPRIETARY}$ file 25.1, 25.2 in the application branch ADF. According to a corresponding procedure, the other manufacturer's mobile station then checks whether this manufacturer's information is recorded in the file and, if required, reads the proprietary information from its own record and makes the necessary updates.

According to one embodiment, the method according to the invention is also suitable for SIM cards that lack a microcontroller. In that case, at least memory devices for recording data can be found on the card, which will not necessarily include the described file structure, instead the mobile station may, for instance, create it itself.

The SIM card according to the invention can be preferably used in terminals operating in UMTS, TETRA, CDMA, etc. networks, i.e. it includes an application branch for each network system.

The method according to the invention also substantially improves the transferability of SIM cards between different manufacturers mobile stations. If the proprietary information is not encrypted, its coding can be shown to other manufacturers too, whose products have the same interface properties. This permits other manufacturers to implement a corresponding mechanism in their own mobile stations, as the solution will become generally known through the standard. A similar development is illustrated, for example, in the sending of so-called smart messages, such as WAP settings, over an air interface. A public definition document exists for this and the service uses the standard SMS service as a link.

It should be understood that the above description and the related figures are intended only to illustrate the method according to the present invention. The invention is thus not limited only to the embodiments described above or defined in the claims, but instead many different variations and adaptations of the invention, which are possible within the scope of the inventive idea defined in the accompanying claims, will be apparent to one versed in the art.

What is claimed is:

1. A method for presenting proprietary information in a SIM card of a mobile equipment, which includes at least an updatable address space, in which the updatable address space includes file areas for at least the application data of different mobile communications network systems and for end-user or similar subscriber data, comprising reserving in said address space a proprietary address space, wherein said proprietary address space is referred to in an application branch as essentially a file, and which contains proprietary information in a set manner.

2. The method of claim 1, further comprising creating a memory area in an administrative phase of the SIM card.

3. The method of claim 2, further comprising recording data in said memory area by the action of an operator.

4. The method of claim 3, wherein data is recorded in said memory area by action of a user.

5. The method of claim 4, wherein said proprietary information is coded in an encrypted proprietary form.

6. The method of claim 4, wherein said proprietary information is used by equipment of at least two manufacturers.

7. The method of claim 3, wherein the data recorded in said memory area comprises at least one manufacturer's information.

8. The method of claim 7, wherein a content of data in said memory area comprises a manufacturer code, a length of the proprietary information field, and said proprietary information.

9. The method of claim 8, wherein said manufacturer code is derived from a series number of a terminal being used.

10. The method of claim 9, wherein said proprietary information is coded in an encrypted proprietary form.

11. The method of claim 9, wherein said proprietary information is used by equipment of at least two manufacturers.

12. The method of claim 7, wherein said proprietary information is coded in an encrypted proprietary form.

13. The method of claim 7, wherein said proprietary information is used by equipment of at least two manufacturers.

14. The method of claim 8, wherein said proprietary information is coded in an encrypted proprietary form.

15. The method of claim 8, wherein said proprietary information is used by equipment of at least two manufacturers.

16. The method of claim 3, wherein said proprietary information is coded in an encrypted proprietary form.

17. The method of claim 3, wherein said proprietary information is used by equipment of at least two manufacturers.

18. The method of claim 2, wherein said proprietary information is coded in an encrypted proprietary form.

19. The method of claim 2, wherein said proprietary information is used by equipment of at least two manufacturers.

20. The method of claim 1, wherein said proprietary information is coded in an encrypted proprietary form.

21. The method of claim 1, wherein said proprietary information is used by equipment of at least two manufacturers.

22. The method of claim 1, wherein said SIM card includes a microcontroller.

* * * * *